United States Patent
Liu et al.

(10) Patent No.: US 11,718,318 B2
(45) Date of Patent: Aug. 8, 2023

(54) METHOD AND APPARATUS FOR PLANNING SPEED OF AUTONOMOUS VEHICLE, AND STORAGE MEDIUM

(71) Applicant: Apollo Intelligent Driving Technology (Beijing) Co., Ltd., Beijing (CN)

(72) Inventors: Changchun Liu, Beijing (CN); Yaqin Chen, Beijing (CN); Peng Geng, Beijing (CN)

(73) Assignee: Apollo Intelligent Driving (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 16/787,729

(22) Filed: Feb. 11, 2020

(65) Prior Publication Data

US 2020/0269873 A1 Aug. 27, 2020

(30) Foreign Application Priority Data

Feb. 22, 2019 (CN) .......................... 201910135454.2

(51) Int. Cl.
*B60W 60/00* (2020.01)
*B60W 30/18* (2012.01)
(Continued)

(52) U.S. Cl.
CPC .. *B60W 60/0011* (2020.02); *B60W 30/18163* (2013.01); *G01C 21/3453* (2013.01);
(Continued)

(58) Field of Classification Search
CPC ....... B60W 60/0011; B60W 30/18163; B60W 2554/4041; B60W 2754/10;
(Continued)

(56) References Cited

U.S. PATENT DOCUMENTS 8,611,585 B2 12/2013 Zhang et al.
9,082,014 B2 7/2015 Terrazas et al.
(Continued)

FOREIGN PATENT DOCUMENTS

CN 101441076 A 5/2009
CN 101966846 A 2/2011
(Continued)

OTHER PUBLICATIONS

Mammeri Abdelhamid et al., "Extending the Detection Range of Vision-Based Vehicular Instrumentation," IEEE Transactions on Instrumentation and Measurement, IEEE Service Center, Piscataway, NJ, US, vol. 65, No. 4, Apr. 1, 2016, pp. 856-873, XP011602110, ISSN: 0018-9456, DOI: 10.1109/TIM.2016.2514780.
(Continued)

*Primary Examiner* — Jeff A Burke
*Assistant Examiner* — Joshua Alexander Garza
(74) *Attorney, Agent, or Firm* — Patterson Thuente, P.A.

(57) ABSTRACT

A method and an apparatus for planning a speed of an autonomous vehicle, and a storage medium are provided. The method includes: generating a plurality of speed trajectories to be selected for the autonomous vehicle before the autonomous vehicle changes a lane; obtaining predicted speeds and predicted positions of an obstacle at the plurality of time points; calculating a cost function value of each of the speed trajectories to be selected, according to the plurality of speed trajectories to be selected, the predicted speeds and the predicted positions; and selecting a speed trajectory to be selected with a minimum cost function value as a planning speed trajectory of the autonomous vehicle. A speed of the autonomous vehicle can be adjusted before the autonomous vehicle changes a lane, thereby creating an opportunity and a safe distance for the lane change, and improving a success rate of the lane change.

14 Claims, 6 Drawing Sheets

(51) Int. Cl.
  *G01C 21/34* (2006.01)
  *G05D 1/02* (2020.01)
  *G06V 20/58* (2022.01)

(52) U.S. Cl.
  CPC ......... *G05D 1/0223* (2013.01); *G05D 1/0238* (2013.01); *G06V 20/58* (2022.01); *B60W 2554/4041* (2020.02); *B60W 2754/10* (2020.02)

(58) Field of Classification Search
  CPC ............. G01C 21/3453; G05D 1/0223; G05D 1/0238; G06K 9/00805
  See application file for complete search history.

(56) References Cited

U.S. PATENT DOCUMENTS

| | | | |
|---|---|---|---|
| 9,760,806 | B1 | 9/2017 | Ning et al. |
| 9,812,838 | B2 | 11/2017 | Villeneuve et al. |
| 10,019,011 | B1* | 7/2018 | Green ............ B60W 30/18109 |
| 10,730,531 | B1* | 8/2020 | Phillips ................. G06N 20/00 |
| 2004/0030476 | A1 | 2/2004 | Oswald et al. |
| 2006/0098872 | A1 | 5/2006 | Seo et al. |
| 2010/0106356 | A1 | 4/2010 | Trepagnier et al. |
| 2011/0282581 | A1 | 11/2011 | Zeng |
| 2014/0032012 | A1 | 1/2014 | Joshi et al. |
| 2014/0195093 | A1* | 7/2014 | Litkouhi ............... B60W 30/16 701/23 |
| 2017/0008522 | A1* | 1/2017 | Sato ..................... G05D 1/0212 |
| 2017/0092000 | A1 | 3/2017 | Schwimmer |
| 2017/0120909 | A1* | 5/2017 | Oniwa ................. G05D 1/0212 |
| 2017/0261318 | A1 | 9/2017 | Takagi et al. |
| 2017/0349183 | A1 | 12/2017 | Sen et al. |
| 2017/0364083 | A1 | 12/2017 | Yang et al. |
| 2018/0148051 | A1* | 5/2018 | Lujan .................. G05D 1/0214 |
| 2018/0150081 | A1* | 5/2018 | Gross .................. G05D 1/0217 |
| 2018/0188739 | A1 | 7/2018 | Tseng et al. |
| 2018/0189599 | A1 | 7/2018 | Sano et al. |
| 2018/0244275 | A1* | 8/2018 | Bremkens ............ G05D 1/0276 |
| 2018/0246517 | A1* | 8/2018 | Costa ................. B60W 30/0953 |
| 2018/0281787 | A1* | 10/2018 | Shiota ................. B60T 8/17557 |
| 2018/0341269 | A1* | 11/2018 | Lv ....................... G01C 21/3407 |
| 2019/0071093 | A1* | 3/2019 | Ma .......................... G08G 1/167 |
| 2019/0187725 | A1 | 6/2019 | Zhang et al. |
| 2019/0204842 | A1* | 7/2019 | Jafari Tafti .............. G06N 3/04 |
| 2020/0139959 | A1* | 5/2020 | Akella ................. G05D 1/0214 |
| 2020/0142417 | A1* | 5/2020 | Hudecek ........... B60W 30/0953 |
| 2021/0237769 | A1* | 8/2021 | Ostafew ................. G08G 1/163 |

FOREIGN PATENT DOCUMENTS

| | | |
|---|---|---|
| CN | 102663196 A | 9/2012 |
| CN | 103258338 A | 8/2013 |
| CN | 103649683 A | 3/2014 |
| CN | 103914830 A | 7/2014 |
| CN | 104020674 A | 9/2014 |
| CN | 104331910 A | 11/2014 |
| CN | 104183014 A | 12/2014 |
| CN | 104376297 A | 2/2015 |
| CN | 104422928 A | 3/2015 |
| CN | 104457569 A | 3/2015 |
| CN | 104590259 A | 5/2015 |
| CN | 104899855 A | 9/2015 |
| CN | 104933708 A | 9/2015 |
| CN | 104933856 A | 9/2015 |
| CN | 104950883 A | 9/2015 |
| CN | 105549597 A | 5/2016 |
| CN | 105761308 A | 7/2016 |
| CN | 105806353 A | 7/2016 |
| CN | 105844600 A | 8/2016 |
| CN | 105957145 A | 9/2016 |
| CN | 106114507 A | 11/2016 |
| CN | 106204457 A | 12/2016 |
| CN | 106364486 A | 2/2017 |
| CN | 106462757 A | 2/2017 |
| CN | 106585622 A | 4/2017 |
| CN | 106599832 A | 4/2017 |
| CN | 106627592 A | 5/2017 |
| CN | 106681318 A | 5/2017 |
| CN | 106845412 A | 6/2017 |
| CN | 106874597 A | 6/2017 |
| CN | 106919908 A | 7/2017 |
| CN | 106940933 A | 7/2017 |
| CN | 106971624 A | 7/2017 |
| CN | 104931977 B | 8/2017 |
| CN | 106997049 A | 8/2017 |
| CN | 107103627 A | 8/2017 |
| CN | 10713 9923 A | 9/2017 |
| CN | 107161155 A | 9/2017 |
| CN | 107305383 A | 10/2017 |
| CN | 107315411 A | 11/2017 |
| CN | 107657237 A | 2/2018 |
| CN | 107659774 A | 2/2018 |
| CN | 107672589 A | 2/2018 |
| CN | 107678306 A | 2/2018 |
| CN | 107818293 A | 3/2018 |
| CN | 107832806 A | 3/2018 |
| CN | 107976688 A | 5/2018 |
| CN | 107992050 A | 5/2018 |
| CN | 107993512 A | 5/2018 |
| CN | 108010360 A | 5/2018 |
| CN | 207407892 U | 5/2018 |
| CN | 108156419 A | 6/2018 |
| CN | 108256506 A | 7/2018 |
| CN | 108323190 A | 7/2018 |
| CN | 108459588 A | 8/2018 |
| CN | 108460980 A | 8/2018 |
| CN | 108492356 A | 9/2018 |
| CN | 108519773 A | 9/2018 |
| CN | 108583578 A | 9/2018 |
| CN | 108646735 A | 10/2018 |
| CN | 108698600 A | 10/2018 |
| CN | 109101022 A | 12/2018 |
| DE | 102006060905 A1 | 6/2008 |
| EP | 3346237 A1 | 7/2018 |
| JP | 2009157502 A | 7/2009 |
| JP | WO 2012/001755 A1 | 8/2013 |
| JP | 2014080046 A | 5/2014 |
| JP | 2014211759 A | 11/2014 |
| JP | 2015079223 A | 4/2015 |
| JP | 2015207171 A | 11/2015 |
| JP | 2017091273 A | 5/2017 |
| JP | 2017214035 A | 12/2017 |
| JP | 2018060511 A | 4/2018 |
| JP | 2018060512 A | 4/2018 |
| JP | 2018203108 A | 12/2018 |
| KR | 20100158093 A | 10/2010 |
| KR | 20160047087 A | 5/2016 |
| KR | 20170121883 A | 11/2017 |
| RO | 132599 A2 | 5/2018 |
| TW | 200945245 A | 11/2009 |
| TW | 201643063 A | 12/2016 |
| WO | WO 2018/138584 A1 | 8/2018 |

OTHER PUBLICATIONS

Xiangyu Yue et al., "A LiDAR Point Cloud Generator: from a Virtual World to Autonomous Driving," Arxiv: 1804.00103V1, arxiv.org, Cornell University Library, 201 OLIN Library Cornell University Ithaca, NY 14853, Mar. 31, 2018, XP081225058, Retrieved from Internet: URL: https://arxiv.org/abs/1804.00103, 7 pages.

Christopher Gustav Keller et al., "Real-time recognition of U.S. speed signs," Intelligent Vehicles Symposium, 2008 IEEE, IEEE, Piscataway, NJ, USA, Jun. 4, 2008, pp. 518-823, XP031318927, ISBN: 978-1-4244-2568-6.

Gijs Dubbelman, "Vision based Obstacle Detection for both Day and Night Conditions," Dec. 31, 2006, XP055618096, Retrieved from the Internet: URL: https://staff.fnwi.uva.nl/a.visser/research/ias/alumni/m.sc.theses/theses/GijsDubbelman.pdf, 126 pages.

Alireza Asvadi et al., "DepthCN: Vehicle detection using 3D-LIDAR and ConvNet," 2017 IEEE 20th International Conference on Intel-

(56) References Cited

OTHER PUBLICATIONS ligent Transportation Systems (ITSC), IEEE, Oct. 16, 2017, pp. 1-6, XP033330533, DOI: 10.1109/ITSC.2017.8317880.

Agnieszka Mikolajczyk et al., "Data augmentation for improving deep learning in image classification problem," 2018 International Interdisciplinary PHD Workshop (IIPHDW), IEEE, May 9, 2018, pp. 117-122, XP033360783, DOI: 10.1109/IIPHDW.2018.8388338.

Raymond A. Yeh et al., "Semantic Image Inpainting with Deep Generative Models," ARXIV—1611.07004V2, Nov. 14, 2016, pp. 6882-6890, XP055532717, DOI: 10.1109/CVPR.2017.728, ISBN: 978-1-5386-0457-1.

Xiaohu Lu et al., "Pairwise Linkage for Point Cloud Segmentation," ISPRS Annals of Photogrammetry, Remote Sensing and Spatial Information Sciences, vol. III-3, Jun. 3, 2016, pp. 201-208, XP055647625, DOI: 10.5194/isprs-annals-III-3-201-2016.

Ma Ling, et al., "The Principle of Microwave Velocity Radar," College of Electronic Engineering and Optoelectronic Technology, NUST, Nanjing, 210094, Journal of Ballistics, vol. 15, No. 4, Dec. 31, 2003, 5 pages.

A. Mantovanelli, et al., "The Use of HR radar surface currents for computing Lagrangian trajectories: benefits and issues," Ocean 10 IEEE Sydney, May 27, 2010, 6 pages.

Chinese First Office Action, Chinese Application No. 2019101354542, dated Mar. 2, 2020, 9 pages.

Chinese Search Report, Chinese Application No. 2019101354542, dated Feb. 19, 2020.

Nilsson J., et al., "Predictive manoeuvre generation for automated driving," Proceedings of the 16th International IEEE Annual Conference on Intelligent Transportation Systems (ITSC 2013), The Hague, The Netherlands, Oct. 6-9, 2013, 6 pages.

Notice of Reasons for Refusal for Japanese Application No. 2020-025125, dated Mar. 2, 2021, 10 pages.

Office Action For Korean Application No. 10-2020-0019757, dated Feb. 17, 2021, 13 pages.

European Search Report, Application No. 20275038.6, dated Jul. 23, 2020, 25 pages.

\* cited by examiner

METHOD AND APPARATUS FOR PLANNING SPEED OF AUTONOMOUS VEHICLE, AND STORAGE MEDIUM

CROSS-REFERENCE TO RELATED APPLICATION

This application claims priority to Chinese Patent Application No. 201910135454.2, entitled "Method and Apparatus for Planning Speed of Autonomous Vehicle, and Storage Medium", and filed on Feb. 22, 2019, which is hereby incorporated by reference in its entirety.

TECHNICAL FIELD

The present disclosure relates to automatic driving, and particularly to a method and an apparatus for planning a speed of an autonomous vehicle, and a storage medium.

BACKGROUND

The autonomous vehicle includes vehicles travelling in an autonomous mode, such as driverless mode. The autonomous vehicle can liberate passengers, especially a driver, from driving. The autonomous vehicles can be navigated to various locations by using on-board sensors, so as to travel with minimal human-computer interactions or without any passengers. During a lane change of travelling, the autonomous vehicle moves from one lane to another lane, which is referred to as a merge into a traffic flow. Before the lane change, it is required to determine a travelling trajectory, including travelling speed, for the autonomous vehicle. If a determined speed is unreasonable, a traffic accident will occur.

SUMMARY

The embodiments of the present disclosure provide a method and apparatus for determining a speed of an autonomous vehicle, and a non-volatile computer-readable storage medium, so as to solve one or more technical problems in the existing technology.

According to a first aspect, a method for planning a speed of an autonomous vehicle is provided according to an embodiment of the disclosure. The method may include:

generating a plurality of speed trajectories to be selected for the autonomous vehicle before the autonomous vehicle changes a lane, wherein the speed trajectory to be selected comprises the speeds to be selected at a plurality of time points within a preset time range;

obtaining predicted speeds and predicted positions of an obstacle at the plurality of time points;

calculating a cost function value of each of the speed trajectories to be selected, according to the plurality of speed trajectories to be selected, the predicted speeds, and the predicted positions; and selecting a speed trajectory to be selected with a minimum cost function value, as a planning speed trajectory of the autonomous vehicle.

In an embodiment, calculating the calculating a cost function value of each of the speed trajectories to be selected, according to the plurality of speed trajectories to be selected, the predicted speeds, and the predicted positions includes:

setting an expected distance at each time point, according to the speed to be selected of the autonomous vehicle at each time point and the predicted speed of the obstacle at each time point, wherein the expected distance is a safe distance from the autonomous vehicle to the obstacle;

calculating a cost function value of the speed trajectory to be selected at each time point according to the expected distance and a distance to be selected at each time point, wherein the distance to be selected is a distance from the autonomous vehicle to the obstacle on the speed trajectory to be selected; and obtaining the cost function value of the speed trajectory to be selected according to the cost function value of the speed trajectory to be selected at each time point.

In an embodiment, the calculating a cost function value of each of the speed trajectories to be selected, according to the plurality of speed trajectories to be selected, the predicted speeds, and the predicted positions includes:

generating a travelling route trajectory in a route-time coordinate system according to the speed trajectory to be selected, wherein a horizontal axis and a longitudinal axis of the route-time coordinate system denote a time and a position respectively; and mapping a plurality of predicted positions of the obstacle into the route-time coordinate system to obtain a mapping route trajectory of the obstacle, according to a correspondence relation to the time points.

In one embodiment, the setting an expected distance at each time point, according to the speed to be selected of the autonomous vehicle at each time point and the predicted speed of the obstacle at each time point includes:

determining a lane change corresponding to the speed trajectory to be selected as a lane change for overtaking or a lane change for yielding, according to the travelling route trajectory and the mapping route trajectory;

if the lane change is determined as a lane change for overtaking, calculating the expected distance at each time point according to a formula:

$$d\_desire = v\_obs \times x1 + (v\_obs - v\_adc) \times x2 + x3;$$

wherein d_desire is an expected distance at the time point, v_obs is a predicted speed at the time point, v_adc is a speed to be selected at the time point, and x1, x2 and x3 are a first preset parameter, a second preset parameter and a third preset parameter, respectively.

In an embodiment, the setting an expected distance at each time point, according to speed to be selected of the autonomous vehicle at each time point and predicted speed of an obstacle at each time point includes:

if the lane change is determined as a lane change for yielding, calculating the expected distance at each time point according to a formula:

$$d\_desire = v\_obs \times x1 + (v\_adc - v\_obs) \times x2 + x3.$$

In an embodiment, the calculating a cost function value of the speed trajectory to be selected at each time point according to the expected distance and a distance to be selected at the each time point includes:

determining the distance to be selected at each time point, according to the travelling route trajectory and the mapping route trajectory;

calculating the cost function value of the speed trajectory to be selected at each time point according to a formula cost=max[0, −x4(d−d_desire)], wherein d is a distance to be selected at the time point, d_desire is an expected distance at the time point, and x4 is a fourth preset parameter.

According to a second aspect, an apparatus for planning a speed of an autonomous vehicle, is provided according to an embodiment of the disclosure. The apparatus may include:

a generating module configured to generate a plurality of speed trajectories to be selected for the autonomous vehicle before the autonomous vehicle changes a lane, wherein the speed trajectory to be selected includes the speeds to be selected at a plurality of time points within a preset time range;

an obtaining module configured to obtain predicted speeds and predicted positions of an obstacle at the plurality of time points;

a calculating module configured to calculate a cost function value of each of the speed trajectories to be selected, according to the plurality of speed trajectories to be selected, the predicted speeds, and the predicted positions; and a selecting module configured to select a speed trajectory to be selected with a minimum cost function value, as a planning speed trajectory of the autonomous vehicle.

In an embodiment, the calculation module includes:

an expected distance setting sub-module configured to set an expected distance at each time point, according to the speed to be selected of the autonomous vehicle at each time point and the predicted speed of the obstacle at each time point, wherein the expected distance is a safe distance from the autonomous vehicle to the obstacle;

a cost function value calculating sub-module configured to calculate a cost function value of the speed trajectory to be selected at each time point according to the expected distance and a distance to be selected at each time point, wherein the distance to be selected is a distance from the autonomous vehicle to the obstacle on the speed trajectory to be selected; and a cost function value obtaining sub-module configured to obtain the cost function value of the speed trajectory to be selected according to the cost function value of the speed trajectory to be selected at each time point.

In an embodiment, the calculating module includes:

a travelling route trajectory generating sub-module configured to generate a travelling route trajectory in a route-time coordinate system according to the speed trajectory to be selected, wherein a horizontal axis and a longitudinal axis of the route-time coordinate system denote a time and a position respectively; and a mapping route trajectory obtaining sub-module configured to map a plurality of predicted positions of the obstacle into the route-time coordinate system to obtain a mapping route trajectory of the obstacle, according to a correspondence relation to the time points.

In an embodiment, the expected distance calculating sub-module further includes:

a judging unit configured to determine a lane change corresponding to the speed trajectory to be selected as a lane change for overtaking or a lane change for yielding, according to the travelling route trajectory and the mapping route trajectory; and a first calculating unit configured to, if the lane change is determined as a lane change for overtaking, calculate the expected distance at each time point according to a formula: $d\_desire = v\_obs \times x1 + (v\_obs - v\_adc) \times x2 + x3$; wherein $d\_desire$ is an expected distance for the time point, $v\_obs$ is a predicted speed at the time point, $v\_adc$ is a speed to be selected at the time point, and x1, x2 and x3 are a first preset parameter, a second preset parameter and a third preset parameter, respectively.

In an embodiment, the expected distance setting sub-module further includes:

a second calculating unit configured to, if the lane change is determined as a lane change for yielding, calculate the expected distance at each time point according to a formula: $d\_desire = v\_obs \times x1 + (v\_adc - v\_obs) \times x2 + x3$.

In an embodiment, the cost function value calculating sub-module includes:

a determining unit configured to determine the distance to be selected at each time point, according to the travelling route trajectory and the mapping route trajectory; and a calculating unit configured to calculate the cost function value of the speed trajectory to be selected at each time point according to a formula $cost = \max[0, -x4(d - d\_desire)]$, wherein d is a distance to be selected at the time point, $d\_desire$ is an expected distance at the time point, and x4 is a fourth preset parameter.

According to a third aspect, an apparatus for planning a speed of an autonomous vehicle is provided according to an embodiment of the disclosure, and the functions thereof may be realized by hardware or by hardware to execute corresponding software. The hardware or the software includes one or more modules corresponding to the above functions.

In a possible implementation, the structure of the apparatus includes a memory configured to store a program supporting the apparatus to perform any of the above methods for planning a speed of an autonomous vehicle, and a processor configured to execute the program stored in the memory. The apparatus may further include a communication interface configured to communicate with other device or a communication network.

According to a fourth aspect, a computer-readable storage medium is provided according to an embodiment of the disclosure, which is configured to store computer software instructions used by an apparatus for planning a speed of an autonomous vehicle, and including a program involved in performing any of the above methods for planning a speed of an autonomous vehicle.

According to the above technical solutions, a planning speed may be more reasonable by generating a plurality of speed trajectories to be selected, calculating a cost function value of the speed trajectories to be selected according to relative positions and relative speeds between the autonomous vehicle and the obstacle, and determining a speed trajectory to be selected with a minimum cost function value as a planning speed of the autonomous vehicle before the autonomous vehicle changes a lane. Further, in the above technical solutions, the method for calculating the cost function value may adjust the speed of the autonomous vehicle before the autonomous vehicle changes a lane, so that the distance from the autonomous vehicle to the obstacle on the target lane is increased, thereby creating an opportunity and a safe distance for the lane change, and improving a success rate of the lane change.

The above summary is for the purpose of the specification only and is not intended to be limiting in any way. In addition to the illustrative aspects, embodiments, and characters described above, further aspects, embodiments, and characters of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments dis

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
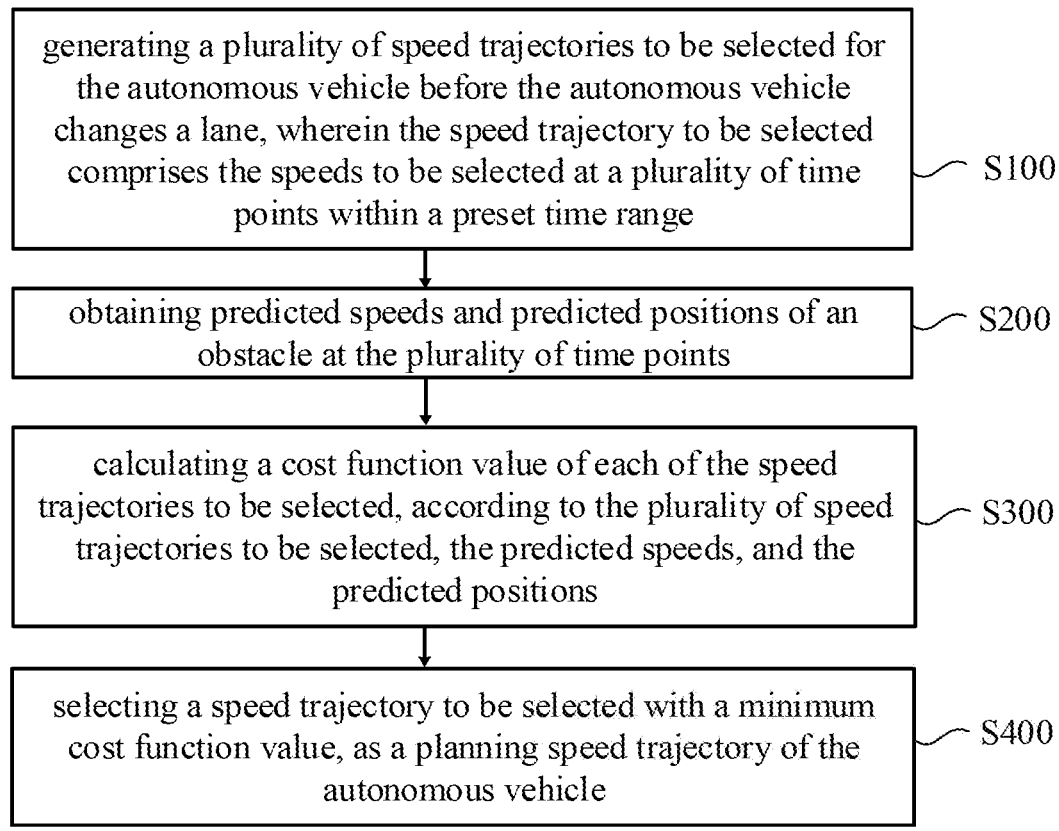
- FIG. 1 illustrates a flowchart of a method for planning a speed of an autonomous vehicle according to an embodiment of the present disclosure.

FIG. 1 illustrates a flowchart of a method for planning a speed of an autonomous vehicle according to an embodiment of the present disclosure. As illustrated in FIG. 1, the method may include the following operations:

S100: generating a plurality of speed trajectories to be selected for the autonomous vehicle before the autonomous vehicle changes a lane, wherein the speed trajectory to be selected comprises the speeds to be selected at a plurality of time points within a preset time range;

S200: obtaining predicted speeds and predicted positions of an obstacle at the plurality of time points;

S300: calculating a cost function value of each of the speed trajectories to be selected, according to the plurality of speed trajectories to be selected, the predicted speeds, and the predicted positions; and S400: selecting a speed trajectory to be selected with a minimum cost function value, as a planning speed trajectory of the autonomous vehicle.

When the autonomous vehicle travels along a selected route, the speed of the autonomous vehicle at different time points may be determined so as to provide a speed trajectory for the autonomous vehicle. In this embodiment, the speed trajectory to be selected may be represented by a two-dimensional trajectory formed of speed and time. The preset time range is divided into a plurality of time points by a preset time interval. The speed trajectory to be selected is discretized to obtain a speed to be selected at the time point.

Figure 2A:
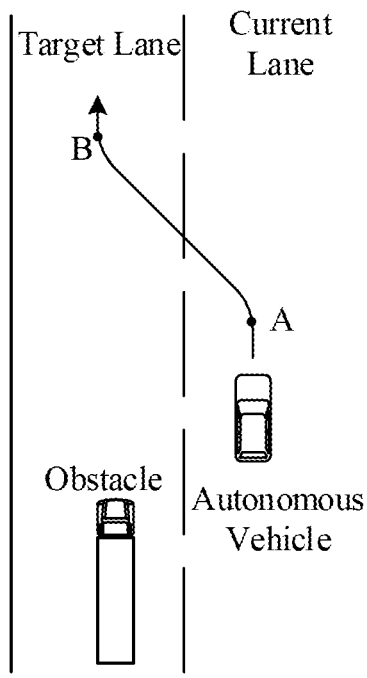
FIGS. 2A and 2B illustrate example diagrams of a method for planning a speed of an autonomous vehicle according to an embodiment of the present disclosure, respectively.
Figure 2B:
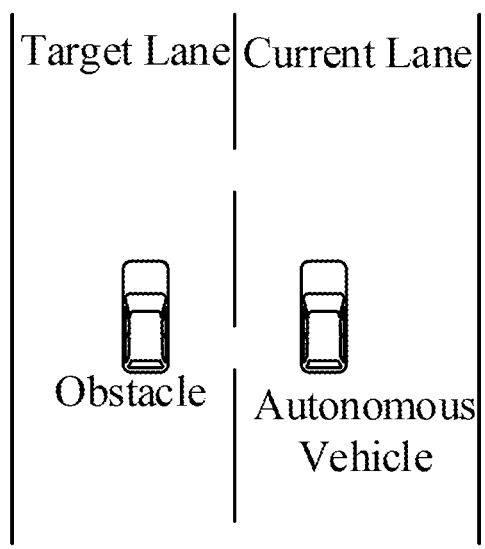

FIGS. 2A and 2B illustrate application scenes of a method for planning a speed of an autonomous vehicle according to an embodiment of the present disclosure, respectively. FIGS. 2A and 2B illustrate a segment of two-lane road having an upward direction as a travelling direction. In FIGS. 2A and 2B, the autonomous vehicle travels on a right lane before a lane change, and travels on a left lane after the lane change, wherein the right lane may be referred to a 'current lane', and the left lane may be referred to a 'target lane'. The target lane may have the obstacles that affect the lane change of the autonomous vehicle, and the obstacles may include pedestrians, animals and vehicles, etc. on the lane.

In FIG. 2A, an autonomous vehicle is located in front of an obstacle before a lane change. In the embodiments of the present disclosure, multiple speed trajectories to be selected within a preset time range may be generated for the autonomous vehicle before the lane change; a cost function value of each of the speed trajectories to be selected is calculated, and a trajectory of speed to be selected with a minimum cost function value is selected as a planning speed trajectory. A planning travelling route trajectory may be obtained according to the planning speed trajectory, and the autonomous vehicle may change its lane according to the planning speed trajectory and the planning travelling route trajectory. For example, the trajectory from point A to point B in FIG. 2A is a route corresponding to the planning travelling route.

In S200, a speed trajectory and a position trajectory of the obstacle within the preset time range may be predicted according to the current travelling condition of the obstacle and in combination with the current data, so as to obtain a predicted speed and a predicted position of the obstacle at each time point.

The relative speed between the obstacle and the autonomous vehicle will affect the relative distance therebetween. Before the lane change, the relative distance between the autonomous vehicle and the obstacle may be obtained according to the predicted speed and the predicted position of the obstacle; and then according to the relative distance, the cost function value of each of the speed trajectories to be selected may be calculated, so that the finally determined planning speed trajectory may be more reasonable. The speed before the lane change may be adjusted, thereby maintaining a lane change distance between the autonomous vehicle and the obstacle sufficient.

In one example, the preset time range may be 8 seconds. An error of the speed trajectory may be increased after the preset 8 seconds, and thus the preset speed within 8 seconds may reduce the data redundancy and improve the accuracy of the planning travelling route and the planning speed.

Figure 3:
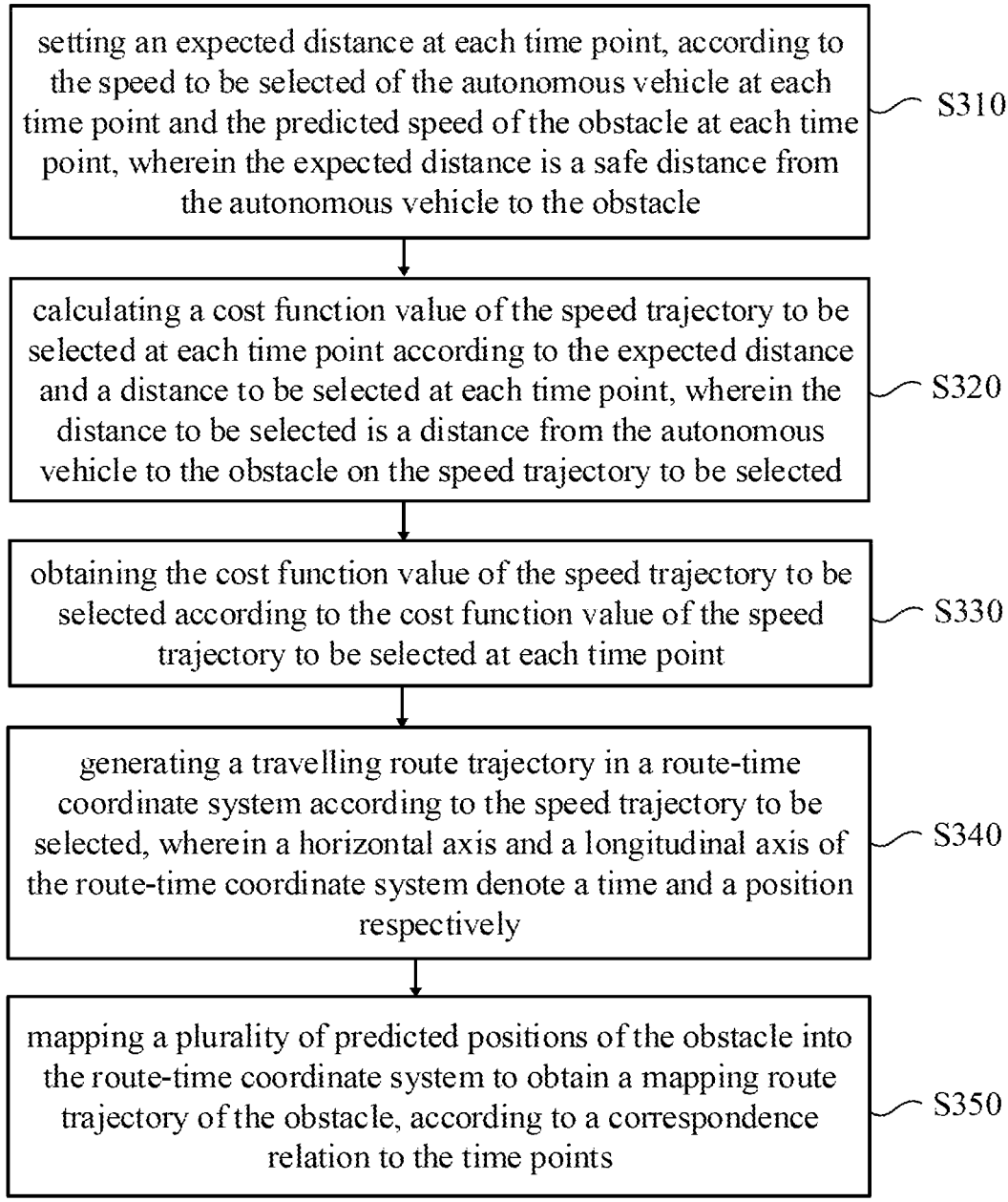
FIG. 3 illustrates a flowchart of a method for planning a speed of an autonomous vehicle according to one of embodiments of the present disclosure.

In one embodiment, as illustrated in FIG. 3, S300 may include:

S310: setting an expected distance at each time point, according to the speed to be selected of the autonomous vehicle at each time point and the predicted speed of the obstacle at each time point, wherein the expected distance is a safe distance from the autonomous vehicle to the obstacle;

S320: calculating a cost function value of the speed trajectory to be selected at each time point according to the expected distance and a distance to be selected at each time point, wherein the distance to be selected is a distance from the autonomous vehicle to the obstacle on the speed trajectory to be selected; and S330: obtaining the cost function value of the speed trajectory to be selected according to the cost function value of the speed trajectory to be selected at each time point.

In S310, according to the speed to be selected at each time point and the predicted speed of the obstacle at the time point, the relative speeds between the autonomous vehicle and the obstacle at the time point may be obtained, and then according to the relative speeds, an expected distance at the time point may be calculated. The expected distance may represent a safe distance away from the obstacle when the autonomous vehicle may successfully change the lane.

At a certain time point, a difference between the distance to be selected and the expected distance, from the autonomous vehicle to the obstacle, will affect the cost function value of speed trajectory to be selected at the time point. For example, the cost function value decreases as the difference decreases.

In S330, the cost function value of the speed trajectory to be selected may be obtained by accumulating the cost function value at each time point.

In FIG. 2B, the autonomous vehicle and the obstacle are side by side before a lane change. According to the method of the embodiments of the present disclosure, before the lane change, the speed of the autonomous vehicle may be adjusted, so that a safe distance from the autonomous vehicle to the obstacle in the target lane may be provided.

In one embodiment, as illustrated in FIG. 3, S300 may include:

S340: generating a travelling route trajectory in a route-time coordinate system according to the speed trajectory to be selected, wherein a horizontal axis and a longitudinal axis of the route-time coordinate system denote a time and a position respectively; and S350: mapping a plurality of predicted positions of the obstacle into the route-time coordinate system to obtain a mapping route trajectory of the obstacle, according to a correspondence relation to the time points.

Figure 4:
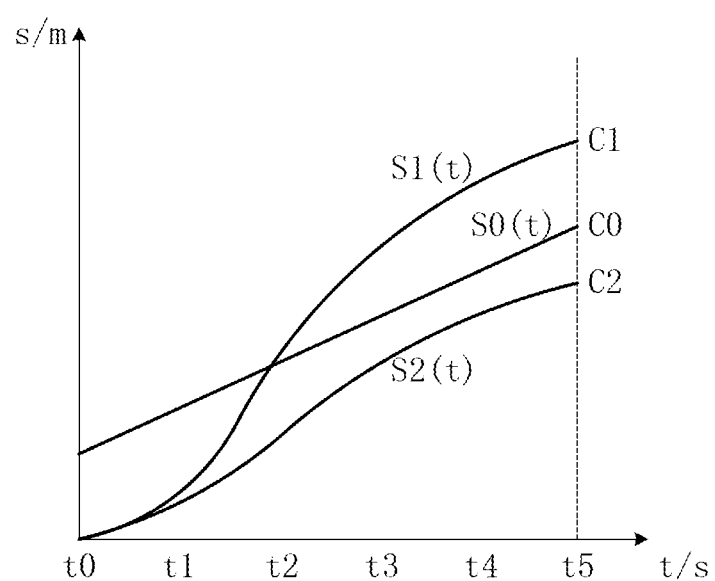
FIG. 4 illustrates a schematic diagram of a travelling route trajectory and a mapping route trajectory in an embodiment of the present disclosure.

In one example, as illustrated in FIG. 4, in the route-time coordinate system, the horizontal axis denotes a time (t) in a unit of second, and the longitudinal axis denotes a position (s) in a unit of meter. In S311, according to a formula s=v×t, trajectories of speed to be selected v1(t) and v2(t) may be converted into travelling route trajectories s1(t) and s2(t), respectively, and s1(t) and s2(t) may be expressed in the route-time coordinate system. The predicted positions of the obstacle at each time point are mapped into the route-time coordinate system to obtain a plurality of discrete points, and a mapping route trajectory s0(t) of the obstacle may be obtained by fitting the plurality of discrete points. The preset time range Δt includes multiple time points t0, t1, t2, t3, t4 and t5.

Figure 5:
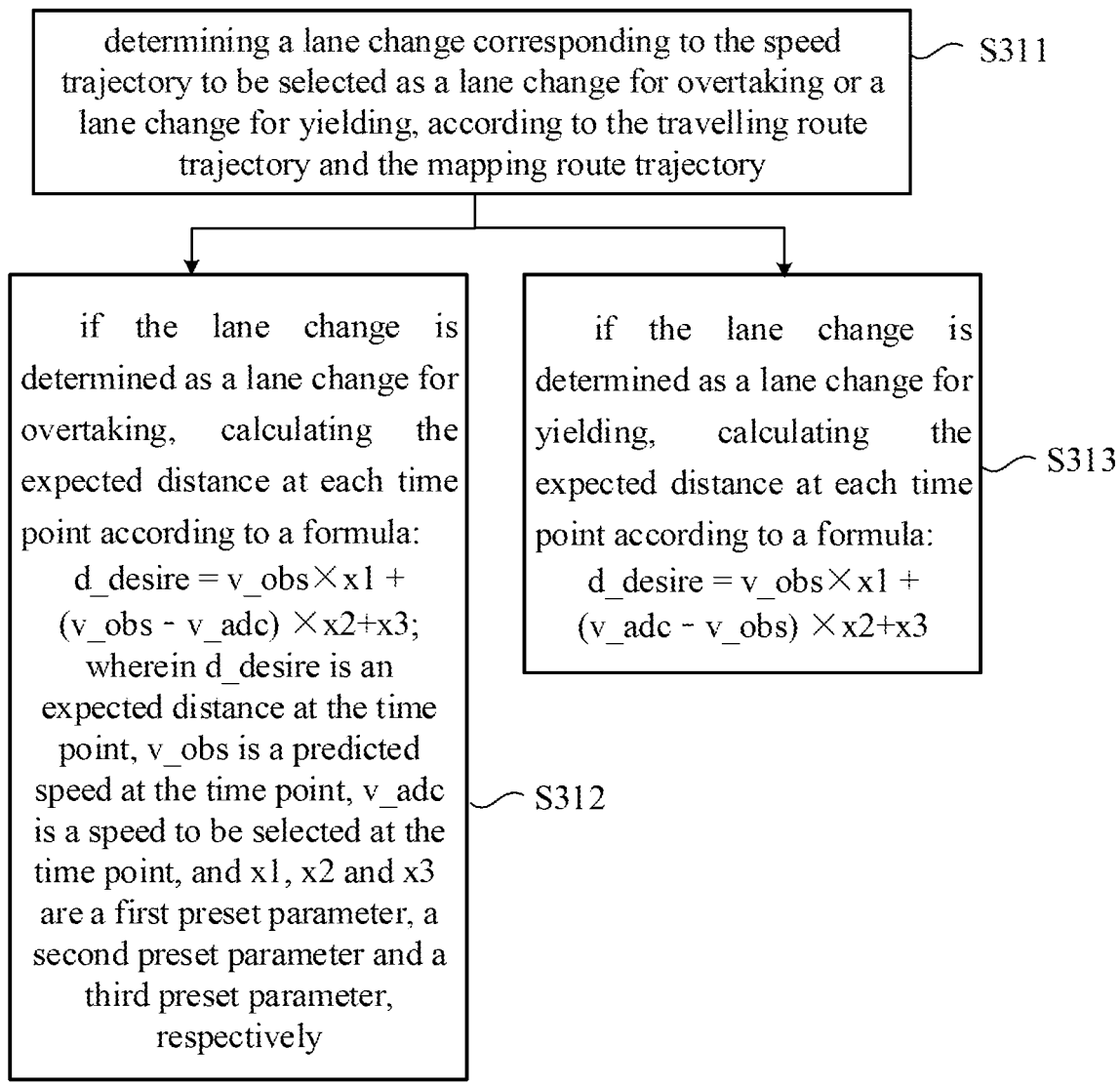
FIG. 5 illustrates a flowchart of a method for planning a speed of an autonomous vehicle according to another one of embodiments of the present disclosure.

In one embodiment, as illustrated in FIG. 5, S310 may include:

S311: determining a lane change corresponding to the speed trajectory to be selected as a lane change for overtaking or a lane change for yielding, according to the travelling route trajectory and the mapping route trajectory;

S312: if the lane change is determined as a lane change for overtaking, calculating the expected distance at each time point according to a formula:

$$d\_desire = v\_obs \times x1 + (v\_obs - v\_adc) \times x2 + x3;$$

wherein d_desire is an expected distance at the time point, v_obs is a predicted speed at the time point, v_adc is a speed to be selected at the time point, and x1, x2 and x3 are a first preset parameter, a second preset parameter and a third preset parameter, respectively; and S313: if the lane change is determined as a lane change for yielding, calculating the expected distance at each time point according to a formula:

$$d\_desire = v\_obs \times x1 + (v\_adc - v\_obs) \times x2 + x3.$$

In S311, a lane change corresponding to the speed trajectory to be selected may be determined as a lane change for overtaking or a lane change for yielding, according to a relative position between the autonomous vehicle and the obstacle at a last time point within the preset time range.

Next, the description is continued with reference to FIG. 4. In FIG. 4, C0 denotes a position of the obstacle at a last time point t5; C1 denotes a position of the autonomous vehicle when travelling to the time point t5 based on the trajectory of speed to be selected v1(t); C2 denotes a position of the autonomous vehicle when travelling to the time point t5 based on the trajectory of speed to be selected v2(t). When C1 is located above C0, it is determined that the lane change expressed by the trajectory of speed to be selected v1(t) is a lane change for overtaking; and when C2 is located below C0, it is determined that the lane change expressed by the trajectory of speed to be selected v2(t) is a lane change for yielding.

In S312 and S313, the first preset parameter x1, the second preset parameter x2, and the third preset parameter x3 may be preset according to actual experiences. For example, x3 is set as a minimum distance allowed between the autonomous vehicle and the obstacle during the lane change.

In one embodiment, in S320, the distance to be selected at each time point is determined according to the travelling route trajectory and the mapping route trajectory; the cost function value of the speed trajectory to be selected at the time point is calculated, according to a formula cost=max[0, −x4(d−d_desire)], wherein d is a distance to be selected at the time point, d_desire is an expected distance at the time point, and x4 is a fourth preset parameter.

In this embodiment, the cost function value of the speed trajectory to be selected at each time point is calculated according to the formula cost=max[0, − x4(d−d_desire)], and then the cost function value of the speed trajectory to be selected is calculated.

In summary, in the method for planning the speed of the autonomous vehicle according to the embodiments of the present disclosure, by generating a plurality of speed trajectories to be selected; calculating a cost function value of each of the speed trajectories to be selected, according to the relative positions and the relative speeds between the autonomous vehicle and the obstacle; and then determining a speed trajectory to be selected with a minimum cost function value as a planning speed trajectory for the lane change of the autonomous vehicle, the planning speed may be more reasonable and a sufficient lane change distance from the obstacle in the target lane may be maintained before the lane change.

Further, when the cost function value is calculated, in consideration of the safe distance between the autonomous vehicle and the obstacle, and the distance to be selected, it is possible to adjust the speed of the autonomous vehicle before the lane change in order to increase the distance from the obstacle, thereby creating an opportunity and a safe distance for the lane change, and then improving the success rate of the lane change (the merge into the traffic flow).

In addition, upon planning a speed, different calculating methods of the cost function value adopted for the overtaking lane change and the yielding lane change lead to a more accuracy.

Figure 6:
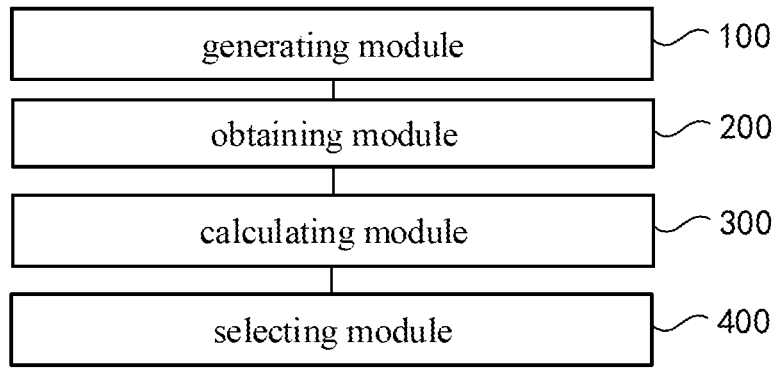
FIG. 6 illustrates a structural block diagram of an apparatus for planning a speed of an autonomous vehicle according to an embodiment of the present disclosure.

FIG. 6 illustrates a structural block diagram of an apparatus for planning a speed of an autonomous vehicle according to an embodiment of the present disclosure. As illustrated in FIG. 6, the apparatus includes:

a generating module 100 configured to generate a plurality of speed trajectories to be selected for the autonomous vehicle before the autonomous vehicle changes a lane, wherein the speed trajectory to be selected comprises the speeds to be selected at a plurality of time points within a preset time range;

an obtaining module 200 configured to obtain predicted speeds and predicted positions of an obstacle at the plurality of time points;

a calculating module 300 configured to calculate a cost function value of each of the speed trajectories to be selected, according to the plurality of speed trajectories to be selected, the predicted speeds, and the predicted positions; and a selecting module 400 configured to select a speed trajectory to be selected with a minimum cost function value, as a planning speed trajectory of the autonomous vehicle.

Figure 7:
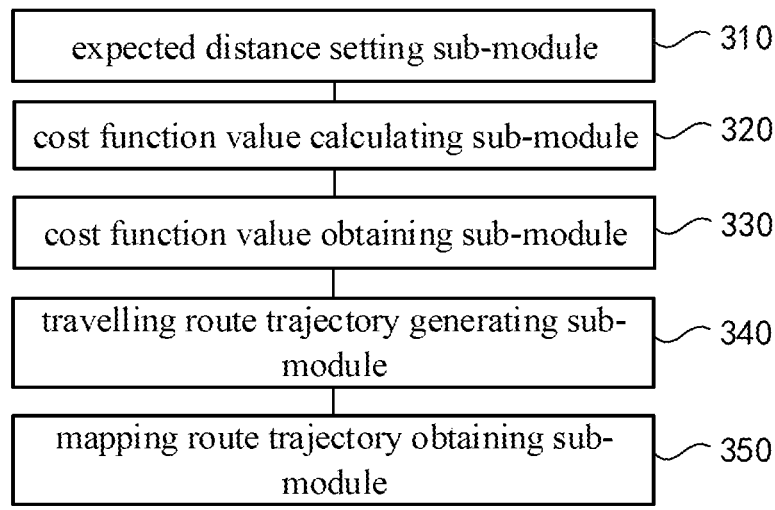
FIG. 7 illustrates a structural block diagram of an apparatus for planning a speed of an autonomous vehicle according to one of embodiments of the present disclosure.

In one embodiment, as illustrated in FIG. 7, the calculating module 300 may include:

an expected distance setting sub-module 310 configured to set an expected distance at each time point, according to the speed to be selected of the autonomous vehicle at each time point and the predicted speed of the obstacle at each time point, wherein the expected distance is a safe distance from the autonomous vehicle to the obstacle;

a cost function value calculating sub-module 320 configured to calculate a cost function value of the speed trajectory to be selected at each time point according to the expected distance and a distance to be selected at each time point, wherein the distance to be selected is a distance from the autonomous vehicle to the obstacle on the speed trajectory to be selected; and a cost function value obtaining sub-module 330 configured to obtain the cost function value of the speed trajectory to be selected according to the cost function value of the speed trajectory to be selected at each time point.

In one embodiment, as illustrated in FIG. 7, the calculating module 300 may further include:

a travelling route trajectory generating unit 340 configured to generate a travelling route trajectory in a route-time coordinate system according to the speed trajectory to be selected, wherein a horizontal axis and a longitudinal axis of the route-time coordinate system denote a time and a position respectively;

a mapping route trajectory obtaining unit 350 configured to map a plurality of predicted positions of the obstacle into the route-time coordinate system to obtain a mapping route trajectory of the obstacle, according to a correspondence relation to the time points.

In one embodiment, the expected distance setting sub-module 310 may further include:

a judging unit configured to determine a lane change corresponding to the speed trajectory to be selected as a lane change for overtaking or a lane change for yielding, according to the travelling route trajectory and the mapping route trajectory; and a first calculating unit configured to, if the lane change is determined as a lane change for overtaking, calculate the expected distance at each time point according to a formula: $d\_desire=v\_obs \times x1+(v\_obs-v\_adc) \times x2+x3$; wherein d_desire is an expected distance for the time point, v_obs is a predicted speed at the time point, v_adc is a speed to be selected at the time point, and x1, x2 and x3 are a first preset parameter, a second preset parameter and a third preset parameter, respectively; and a second calculating unit configured to, if the lane change is determined as a lane change for yielding, calculate the expected distance at each time point according to a formula: $d\_desire=v\_obs \times x1+(v\_adc-v\_obs) \times x2+x3$.

In one embodiment, the cost function value calculating sub-module 320 may further include:

a determining unit configured to determine the distance to be selected at each time point, according to the travelling route trajectory and the mapping route trajectory; and a calculating unit configured to calculate the cost function value of the speed trajectory to be selected at each time point according to a formula $cost=max[0, - x4(d-d\_desire)]$, wherein d is a distance to be selected at the time point, d_desire is an expected distance at the time point, and x4 is a fourth preset parameter.

The function of each of the modules in the apparatus according to the embodiments of the present disclosure can refer to corresponding descriptions in the above method, and will not be repeated here.

Figure 8:
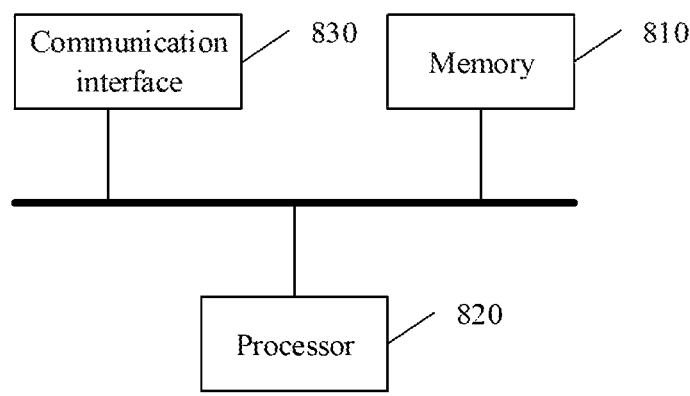
FIG. 8 illustrates a structural block diagram of an apparatus for planning a speed of an autonomous vehicle according to an embodiment of the present disclosure.

FIG. 8 illustrates a structural block diagram of an apparatus for planning a speed of an autonomous vehicle according to an embodiment of the present disclosure. As illustrated in FIG. 8, the apparatus includes a memory 810 and a processor 820, wherein a computer program executable on the processor 820 is stored in the memory 810. When the processor 820 executes the computer program, the method for planning a speed of an autonomous vehicle in the above embodiment is implemented. There may be one or more memories 810 and one or more processors 820.

The apparatus further includes a communication interface 830 configured to communicate with an external device for a data interactive transmission.

The memory 810 may include a high-speed random access memory (RAM), and may also include a non-volatile memory, such as at least one disk memory.

If the memory 810, the processor 820, and the communication interface 830 are implemented independently, the memory 810, the processor 820, and the communication interface 830 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 8, but it does not mean that there is only one bus or one type of bus.

Optionally, in a specific implementation, if the memory 810, the processor 820, and the communication interface 830 are integrated on one chip, the memory 820, the processor 810, and the communication interface 830 may implement mutual communication through an internal interface.

An embodiment of the present disclosure provides a non-volatile computer readable storage medium storing a computer program, which implements the method according to any one of the above embodiments when being executed by a processor.

In the description of the specification, the description of the terms "one embodiment," "some embodiments," "an example," "a specific example," or "some examples" and the like means the specific characters, structures, materials, or characteristics described in connection with the embodiment or example are included in at least one embodiment or example of the present application. Furthermore, the specific characters, structures, materials, or characteristics described may be combined in any suitable manner in any one or more of the embodiments or examples. In addition, different embodiments or examples described in this specification and characters of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical characters. Thus, characters defining "first" and "second" may explicitly or implicitly include at least one of the characters. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a non-volatile computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a non-volatile computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

The invention claimed is:

1. A method for planning a speed of an autonomous vehicle, comprising:
   generating a plurality of speed trajectories to be selected for the autonomous vehicle before the autonomous vehicle changes a lane, wherein each speed trajectory of the plurality speed trajectories to be selected comprises the speeds to be selected at a plurality of time points within a preset time range;
   obtaining predicted speeds and predicted positions of an obstacle at the plurality of time points;
   calculating a cost function value of each speed trajectory of the plurality of speed trajectories to be selected of the autonomous vehicle, according to the plurality of speed trajectories to be selected of the autonomous vehicle, and the predicted speeds and the predicted positions of the obstacle at the plurality of time points, comprising:
      setting, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter, an expected distance at each time point, wherein the expected distance is a safe distance from the autonomous vehicle to the obstacle set to avoid a collision between the autonomous vehicle and the obstacle,
      for each speed trajectory to be selected, calculating the cost function value of the speed trajectory to be selected at each time point according to the expected distance and a distance to be selected at each time point, wherein the distance to be selected is a distance from the autonomous vehicle to the obstacle on the speed trajectory to be selected, and
      obtaining the cost function value of the speed trajectory to be selected within the preset time range according to the cost function value of the speed trajectory to be selected at each time point; and selecting a speed trajectory to be selected with a minimum cost function value, as a planning speed trajectory of the autonomous vehicle;

wherein the setting, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter, comprises:

generating a travelling route trajectory in a route-time coordinate system according to the speed trajectory to be selected, wherein a horizontal axis and a longitudinal axis of the route-time coordinate system denote a time and a position respectively;

mapping a plurality of predicted positions of the obstacle into the route-time coordinate system to obtain a mapping route trajectory of the obstacle, according to a correspondence relation to the time points;

determining, according to the travelling route trajectory and the mapping route trajectory, the lane change corresponding to the speed trajectory to be selected as a lane change for overtaking or a lane change for yielding; and calculating the expected distance at each time point using a first calculating method in response to the lane change being determined as a lane change for overtaking, and calculating the expected distance at each time point using a second calculating method in response to the lane change being determined as a lane change for yielding.

2. The method according to claim 1, wherein the setting, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter, an expected distance at each time point, comprises:

in response to that the lane change is determined as a lane change for overtaking, calculating the expected distance at each time point according to a formula:

$d\_desire = v\_obs \times x1 + (v\_obs - v\_adc) \times x2 + x3$; wherein d_desire is an expected distance at the time point, v_obs is a predicted speed at the time point, v_adc is a speed to be selected at the time point, and x1, x2 and x3 are a first preset parameter, a second preset parameter and a third preset parameter, respectively.

3. The method according to claim 1, wherein the setting an expected distance at each time point, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter comprises:

in response to that the lane change is determined as a lane change for yielding, calculating the expected distance at each time point according to a formula:

$d\_desire = v\_obs \times x1 + (v\_adc - v\_obs) \times x2 + x3$.

4. The method according to claim 1, wherein the calculating a cost function value of the speed trajectory to be selected at each time point according to the expected distance and a distance to be selected at each time point comprises:

determining the distance to be selected at each time point, according to the travelling route trajectory and the mapping route trajectory;

calculating the cost function value of the speed trajectory to be selected at each time point according to a formula $cost = \max[0, -x4(d - d\_desire)]$, wherein d is a distance to be selected at the time point, d_desire is an expected distance at the time point, and x4 is a fourth preset parameter.

5. The method according to claim 1, wherein the cost function value is affected by a difference between the distance to be selected and the expected distance at a certain time point.

6. The method according to claim 5, wherein the cost function value decreases as the difference between the distance to be selected and the expected distance decreases.

7. An apparatus for planning a speed of an autonomous vehicle, comprising:

one or more processors;

a storage device configured to store one or more programs;

wherein the one or more programs are executed by the one or more processors to enable the one or more processors to:

generate a plurality of speed trajectories to be selected for the autonomous vehicle before the autonomous vehicle changes a lane, wherein each speed trajectory of the plurality of speed trajectories to be selected comprises the speeds to be selected at a plurality of time points within a preset time range;

obtain predicted speeds and predicted positions of an obstacle at the plurality of time points;

calculate a cost function value of each speed trajectory of the plurality of speed trajectories to be selected of the autonomous vehicle, according to the plurality of speed trajectories to be selected of the autonomous vehicle, and the predicted speeds and the predicted positions of the obstacle at the plurality of time points, wherein the one or more programs are executed by the one or more processors to enable the one or more processors further to:

set, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter, an expected distance at each time point, wherein the expected distance is a safe distance from the autonomous vehicle to the obstacle set to avoid a collision between the autonomous vehicle and the obstacle;

for each speed trajectory to be selected, calculate the cost function value of the speed trajectory to be selected at each time point according to the expected distance and a distance to be selected at each time point, wherein the distance to be selected is a distance from the autonomous vehicle to the obstacle on the speed trajectory to be selected; and obtain the cost function value of the speed trajectory to be selected within the preset time range according to the cost function value of the speed trajectory to be selected at each time point; and select a speed trajectory to be selected with a minimum cost function value, as a planning speed trajectory of the autonomous vehicle;

wherein the one or more programs are executed by the one or more processors to enable the one or more processors further to:

generate a travelling route trajectory in a route-time coordinate system according to the speed trajectory to be selected, wherein a horizontal axis and a longitudinal axis of the route-time coordinate system denote a time and a position respectively;

map a plurality of predicted positions of the obstacle into the route-time coordinate system to obtain a mapping route trajectory of the obstacle, according to a correspondence relation to the time points;

determine, according to the travelling route trajectory and the mapping route trajectory, the lane change corresponding to the speed trajectory to be selected as a lane change for overtaking or a lane change for yielding; and calculate the expected distance at each time point using a first calculating method in response to the lane change being determined as a lane change for overtaking, and calculate the expected distance at each time point using a second calculating method in response to the lane change being determined as a lane change for yielding.

8. The apparatus according to claim 7, wherein the one or more programs are executed by the one or more processors to enable the one or more processors further to:

in response to that the lane change is determined as a lane change for overtaking, calculate the expected distance at each time point according to a formula: $d\_desire = v\_obs \times x1 + (v\_obs - v\_adc) \times x2 + x3$;

wherein d_desire is an expected distance for the time point, v_obs is a predicted speed at the time point, v_adc is a speed to be selected at the time point, and x1, x2 and x3 are a first preset parameter, a second preset parameter and a third preset parameter, respectively.

9. The apparatus according to claim 7, wherein the one or more programs are executed by the one or more processors to enable the one or more processors further to:

in response to that the lane change is determined as a lane change for yielding, calculate the expected distance at each time point according to a formula: $d\_desire = v\_obs \times x1 + (v\_adc - v\_obs) \times x2 + x3$.

10. The apparatus according to claim 7, wherein the one or more programs are executed by the one or more processors to enable the one or more processors further to:

determine the distance to be selected at each time point, according to the travelling route trajectory and the mapping route trajectory; and calculate the cost function value of the speed trajectory to be selected at each time point according to a formula $cost = \max[0, -x4(d - d\_desire)]$, wherein d is a distance to be selected at the time point, d_desire is an expected distance at the time point, and x4 is a fourth preset parameter.

11. A non-transitory computer-readable storage medium storing a computer program, wherein the computer program, when executed by a processor, causes the processor to perform operations comprising:

generating a plurality of speed trajectories to be selected for the autonomous vehicle before the autonomous vehicle changes a lane, wherein each speed trajectory of the plurality of speed trajectories to be selected comprises the speeds to be selected at a plurality of time points within a preset time range;

obtaining predicted speeds and predicted positions of an obstacle at the plurality of time points;

calculating a cost function value of each speed trajectory of the plurality of speed trajectories to be selected of the autonomous vehicle, according to the plurality of speed trajectories to be selected of the autonomous vehicle, and the predicted speeds and the predicted positions of the obstacle at the plurality of time points, comprising:

setting, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter, an expected distance at each time point, wherein the expected distance is a safe distance from the autonomous vehicle to the obstacle set to avoid a collision between the autonomous vehicle and the obstacle;

for each speed trajectory to be selected, calculating the cost function value of the speed trajectory to be selected at each time point according to the expected distance and a distance to be selected at each time point, wherein the distance to be selected is a distance from the autonomous vehicle to the obstacle on the speed trajectory to be selected; and obtaining the cost function value of the speed trajectory to be selected within the preset time range according to the cost function value of the speed trajectory to be selected at each time point; and selecting a speed trajectory to be selected with a minimum cost function value, as a planning speed trajectory of the autonomous vehicle;

wherein the setting, according to the speed to be selected of the autonomous vehicle at each time point, the predicted speed of the obstacle at each time point, a result of determining whether a lane change corresponding to the speed trajectory to be selected is a lane change for overtaking or a lane change for yielding, and a preset parameter, comprises:

generating a travelling route trajectory in a route-time coordinate system according to the speed trajectory to be selected, wherein a horizontal axis and a longitudinal axis of the route-time coordinate system denote a time and a position respectively;

mapping a plurality of predicted positions of the obstacle into the route-time coordinate system to obtain a mapping route trajectory of the obstacle, according to a correspondence relation to the time points;

determining, according to the travelling route trajectory and the mapping route trajectory, the lane change corresponding to the speed trajectory to be selected as a lane change for overtaking or a lane change for yielding; and calculating the expected distance at each time point using a first calculating method in response to the lane change being determined as a lane change for overtaking, and calculating the expected distance at each time point using a second calculating method in response to the lane change being determined as a lane change for yielding.

12. The non-transitory computer-readable storage medium of claim 11, storing a computer program, wherein the computer program, when executed by a processor, causes the processor to perform further operations comprising:

in response to that the lane change is determined as a lane change for overtaking, calculating the expected distance at each time point according to a formula:

$d\_desire = v\_obs \times x1 + (v\_obs - v\_adc) \times x2 + x3$; wherein d_desire is an expected distance at the time point, v_obs is a predicted speed at the time point, v_adc is a speed to be selected at the time point, and x1, x2 and x3 are a first preset parameter, a second preset parameter and a third preset parameter, respectively.

13. The non-transitory computer-readable storage medium of claim 11, storing a computer program, wherein the computer program, when executed by a processor, causes the processor to perform further operations comprising:

in response to that the lane change is determined as a lane change for yielding, calculating the expected distance at each time point according to a formula:

$d\_desire = v\_obs \times x1 + (v\_adc - v\_obs) \times x2 + x3$.

14. The non-transitory computer-readable storage medium of claim 11, storing a computer program, wherein the computer program, when executed by a processor, causes the processor to perform further operations comprising:

determining the distance to be selected at each time point, according to the travelling route trajectory and the mapping route trajectory;

calculating the cost function value of the speed trajectory to be selected at each time point according to a formula $cost = \max[0, -x4(d - d\_desire)]$, wherein d is a distance to be selected at the time point, d_desire is an expected distance at the time point, and x4 is a fourth preset parameter.

\* \* \* \* \*